United States Patent
Kim et al.

(10) Patent No.: US 10,589,785 B2
(45) Date of Patent: Mar. 17, 2020

(54) LANE KEEPING ASSIST METHOD AND SYSTEM

(71) Applicants: Hyundai Motor Company, Seoul (KR); Kia Motors Corporation, Seoul (KR)

(72) Inventors: Beom Jun Kim, Seoul (KR); Kyoung Jun Lee, Seoul (KR); Doo Jin Um, Seoul (KR); Dong Gu Lee, Seoul (KR); Dong Eon Oh, Seoul (KR); Hyun Jae Yoo, Seoul (KR); Min Chul Kang, Uiwang-si (KR); Dae Young Kim, Gwangmyeong-si (KR); Young Min Han, Gunpo-si (KR); Seung Geon Moon, Hwaseong-si (KR); Sung Woo Choi, Gwangmyeong-si (KR); Chan Il Park, Yanggang-myeon (KR); Sung Yoon Yeo, Seoul (KR); Jee Young Kim, Yongin-si (KR); Hoi Won Kim, Gwacheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 248 days.

(21) Appl. No.: 15/799,954

(22) Filed: Oct. 31, 2017

(65) Prior Publication Data
US 2019/0047621 A1  Feb. 14, 2019

(30) Foreign Application Priority Data

Aug. 10, 2017 (KR) .................. 10-2017-0101846

(51) Int. Cl.
*B62D 15/02* (2006.01)
*G08G 1/16* (2006.01)

(52) U.S. Cl.
CPC ........... *B62D 15/025* (2013.01); *G08G 1/167* (2013.01)

(58) Field of Classification Search
CPC ... B60Q 1/34; B60Q 2300/142; B60W 30/12; B60W 30/18163; B60W 50/10;
(Continued)

(56) References Cited

U.S. PATENT DOCUMENTS 8,239,099 B2 * 8/2012 Iwasaka ............. B60T 8/17557
                                                          348/119
8,818,634 B2   8/2014 Fujita et al.
(Continued)

FOREIGN PATENT DOCUMENTS

JP       2016-207060 A    12/2016
KR   10-2013-0091414 A     8/2013

*Primary Examiner* — Jerrah Edwards
(74) *Attorney, Agent, or Firm* — Morgan, Lewis & Bockius LLP

(57) ABSTRACT

A lane keeping assist method and system may include determining a driving state of a vehicle according to a state of a lane change in which an intention of a driver is reflected after a turn signal is applied, adjusting a criterion for driver override depending on an error between a driving path of the vehicle and a target path according to the driving state of the vehicle, comparing a steering torque of the driver with the adjusted criterion to determine activation or cancellation of the driver override, minimizing the driver's discomfort in the steering operation when the driver intentionally changes the lane.

18 Claims, 10 Drawing Sheets

(58) Field of Classification Search
CPC .... B60W 2050/0073; B60W 2510/202; B60Y 2300/12; B60Y 2300/18166; B62D 15/025; G08G 1/167
See application file for complete search history.

(56) References Cited

U.S. PATENT DOCUMENTS

| | | |
|---|---|---|
| 9,616,924 B2 | 4/2017 | Spero et al. |
| 9,682,725 B2 | 6/2017 | Yamaoka |
| 2009/0005934 A1* | 1/2009 | Iwasaka .............. B60T 8/17557 701/42 |
| 2016/0311464 A1 | 10/2016 | Yamaoka |

* cited by examiner

LANE KEEPING ASSIST METHOD AND SYSTEM

CROSS-REFERENCE TO RELATED APPLICATION

The present application claims priority to Korean Patent Application No. 10-2017-0101846, filed on Aug. 10, 2017, the entire contents of which is incorporated herein for all purposes by this reference.

BACKGROUND OF THE INVENTION

Field of the Invention

The present invention relates to a lane keeping assist method and system and, more particularly, to a lane keeping assist method and system for minimizing discomfort when a driver directly changes a lane while performing a lane keeping control after input of a turn signal.

Description of Related Art

A lane keeping assist system (LKAS) is a system that provides a desired steering torque to control a steering actuator of a vehicle to prevent the vehicle from departing the lane by use of lane information detected by a sensor.

When the driver's intention to steer the vehicle is detected during lane keeping, the lane keeping assist system cancels a lane keeping control. In general, criteria for cancelling a lane keeping control may be the input of a turn signal, or the input of a driver steering torque exceeding a predetermined threshold.

If criteria for an override are maintained to be the same even after the input of the turn signal, the driver may feel discomfort when directly changing a lane due to a delay in determining the lane keeping cancellation. If the criteria for an override are lowered immediately after the input of the turn signal, the lane keeping cancellation may frequently occur.

The information disclosed in the present Background of the Invention section is only for enhancement of understanding of the general background of the invention and may not be taken as an acknowledgement or any form of suggestion that the present information forms the prior art already known to a person skilled in the art.

BRIEF SUMMARY

Various aspects of the present invention are directed to providing a lane keeping assist method and system for solving the following problems: a driver feels discomfort when directly changing a lane when criteria for an override are maintained to be the same; and a lane keeping cancellation frequently occurs when the criteria for an override are lowered.

According to various aspects of the present invention, a lane keeping assist method includes steps of: determining whether a turn signal is applied; determining a state of a lane change in which an intention of a driver is reflected when the turn signal is applied; adjusting a criterion for driver override depending on an error between a driving path of a vehicle and a target path; and comparing a steering torque of the driver with the adjusted criterion to determine the driver override.

The step of adjusting a criterion for driver override may include: setting the criterion for driver override to a first value when the error is greater than a threshold; and determining activation of the driver override when the steering torque of the driver is greater than the first value.

The step of adjusting a criterion for driver override may include: setting the criterion for driver override to a second value greater than the first value when the error is less than the threshold; and determining cancellation of the driver override when the steering torque of the driver is less than the second value.

The step of determining a state of a lane change may include dividing a driving state of the vehicle into a lane keeping state, a ready state for direct lane change, a direct lane change state, and a ready state for lane keeping, according to the state of the lane change.

The lane keeping state may refer to a state in which the turn signal is not applied and a lane change completion rate is 0.

The lane change completion rate may refer to a degree of completion of lane change, which is determined by comparing a lateral movement amount with a lane width.

The ready state for direct lane change may refer to a state in which the driving state of the vehicle is the lane keeping state in a state in which the turn signal is applied, and may refer to a state after the turn signal is applied and before a lateral position error is greater than a first threshold or a heading error is greater than a second threshold.

The direct lane change state may refer to a state in which a lateral position error is greater than a first threshold or a heading error is greater than a second threshold, and may refer to a state after the ready state for direct lane change and before a lane change completion condition is satisfied.

The lane change completion condition may include: the lateral position error is less than a third threshold; the heading error is less than a fourth threshold; and a lane change completion rate is greater than a fifth threshold.

The ready state for lane keeping may refer to a state in which a lateral position error is less than a third threshold, a heading error is less than a fourth threshold, and a lane change completion rate is greater than a fifth threshold, or a state in which the lane change completion rate is greater than or equal to a sixth threshold in a state in which the turn signal is applied.

The criterion for driver override may vary according to the lane keeping state, the ready state for direct lane change, the direct lane change state, and the ready state for lane keeping.

The step of adjusting a criterion for driver override may include setting the first value and the second value with a hysteresis to allow each of the first value and the second value to have a predetermined range to prevent the activation of the driver override and the cancellation of the driver override from being repeatedly switched around the first value and the second value.

A case in which the error is greater than a threshold in the step of adjusting a criterion for driver override depending on an error between a driving path of a vehicle and a target path, may include any one of a case in which the intention of the driver is slower than changing a lane to the target path and a case in which the intention of the driver is faster than changing a lane to the target path.

According to various aspects of the present invention, a lane keeping assist system may include a lane change state determination device determining a state of a lane change of a vehicle after a turn signal is applied; a threshold adjustment device receiving a result of the state of the lane change from the lane change state determination device and adjusting a criterion for driver override depending on an error between a driving path of the vehicle and a target path according to the state of the lane change; and an override determination device comparing a steering torque of a driver with the adjusted criterion to determine the driver override.

The lane change state determination device may determine a driving state of the vehicle as one of a lane keeping state, a ready state for direct lane change, a direct lane change state, and a ready state for lane keeping, according to the state of the lane change.

The threshold adjustment device may adjust the criterion for driver override to a first value when the error is greater than a threshold, and adjust the criterion for driver override to a second value greater than the first value when the error is less than the threshold.

The threshold adjustment device may adjust the criterion for driver override to vary according to the lane keeping state, the ready state for direct lane change, the direct lane change state, and the ready state for lane keeping.

The threshold adjustment device may adjust the criterion for driver override to a first value in the direct lane change state, and adjust the criterion for driver override to a second value greater than the first value in the ready state for lane keeping.

The lane change state determination device may determine the driving state of the vehicle as the direct lane change state when an intention of the driver is slower than changing a lane to the target path or when the intention of the driver is faster than changing a lane to the target path.

The override determination device may determine activation of the driver override when the steering torque of the driver is greater than the first value, and determine cancellation of the driver override when the steering torque of the driver is less than the second value.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
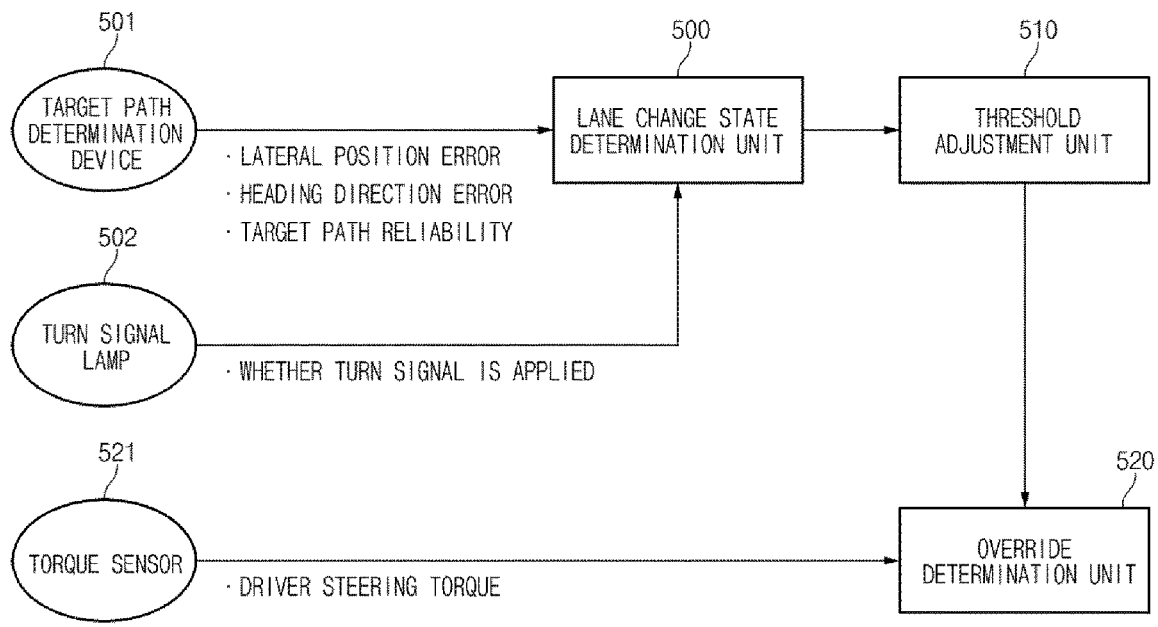
FIG. 1 illustrates the configuration of a lane keeping assist system, according to exemplary embodiments of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings. In the drawings, the same reference numerals will be used throughout to designate the same or equivalent elements. In addition, a detailed description of a related known function or configuration will be ruled out in order not to unnecessarily obscure the gist of the present invention.

Terms such as first, second, A, B, (a), and (b) may be used to describe the elements in exemplary embodiments of the present invention. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present invention belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

A lane keeping assist method, according to exemplary embodiments of the present invention, may determine an override rapidly when a driver intends to change a lane in a direction in which a turn signal is applied and directly changes a lane while the vehicle automatically performs lane keeping, and give a driving control to the driver to minimize the driver's discomfort. Hereinafter, the lane keeping assist method, according to exemplary embodiments of the present invention, is applied to an autonomous vehicle, but is not limited thereto.

FIG. 1 illustrates the configuration of a lane keeping assist system, according to exemplary embodiments of the present invention.

As illustrated in FIG. 1, a lane keeping assist system, according to exemplary embodiments of the present invention, includes a lane change state determination device 500, a threshold adjustment device 510, and an override determination device 520.

In the present invention, the lane keeping assist system is divided into the lane change state determination device 500, the threshold adjustment device 510, and the override determination device 520 for convenience of explanation, but is not necessary to have different physical elements. These elements may be configured as a single processor, and be simply divided by software or executive routine. These elements may be distinguished by function, but can be embodied in the same hardware.

The lane change state determination device 500 may receive information related to a lateral position error and a heading error with respect to a target path determined for lane keeping or lane change from a target path determination device 501, and receive information related to whether or not a turn signal is applied from a turn signal lamp 502. It may determine a driving state according to lane change based on such information as input values. A more detailed description thereof will be provided with reference to FIG. 2.

The threshold adjustment device 510 may receive a result of the determined driving state from the lane change state determination device 500, and adjust steering torque thresholds (criteria for driver override). Adjusting the steering torque thresholds (criteria for driver override) may be performed by adjusting steering torque thresholds Lv0 to Lv3 set for respective driving states in FIG. 3 to any one of A and B in FIG. 5.

For example, in a case of departing from a target path determined in a system in an autonomous driving state, the threshold adjustment device 510 may lower a steering torque threshold (criterion for driver override) to rapidly switch a driving control from the system to the driver. In the instant case, since the steering torque threshold is lowered, even when the driver applies a small steering torque, the control by the system may be cancelled (i.e., the autonomous driving may be cancelled). Thus, the driver may directly change the lane as intended without discomfort.

In addition, in a case of a reduction in degree of departure from the target path as the vehicle approaches the target path determined in the system in a manual driving state, the threshold adjustment device 510 may increase the steering torque threshold (the criterion for driver override) to cancel the driver override. In the instant case, since the steering torque threshold (the criterion for driver override) is increased, even when the driver applies a small steering torque, it may not be determined as the override. As such, when switched to the autonomous driving state through the operation of an input device, the system may take over the driving control.

The override determination device 520 may receive a steering torque of the driver determined by a torque detector 521 and the adjusted threshold, and compare the two values to determine the driver override. When the driver steering torque is less than the steering torque threshold, the driver override may be cancelled, and in the autonomous driving state through the operation of an input device, the system may take control of the vehicle. When the driver steering torque is greater than the steering torque threshold, it may be determined as the driver override, and thus the autonomous driving may be cancelled and the driver may take over the driving control.

Figure 2:
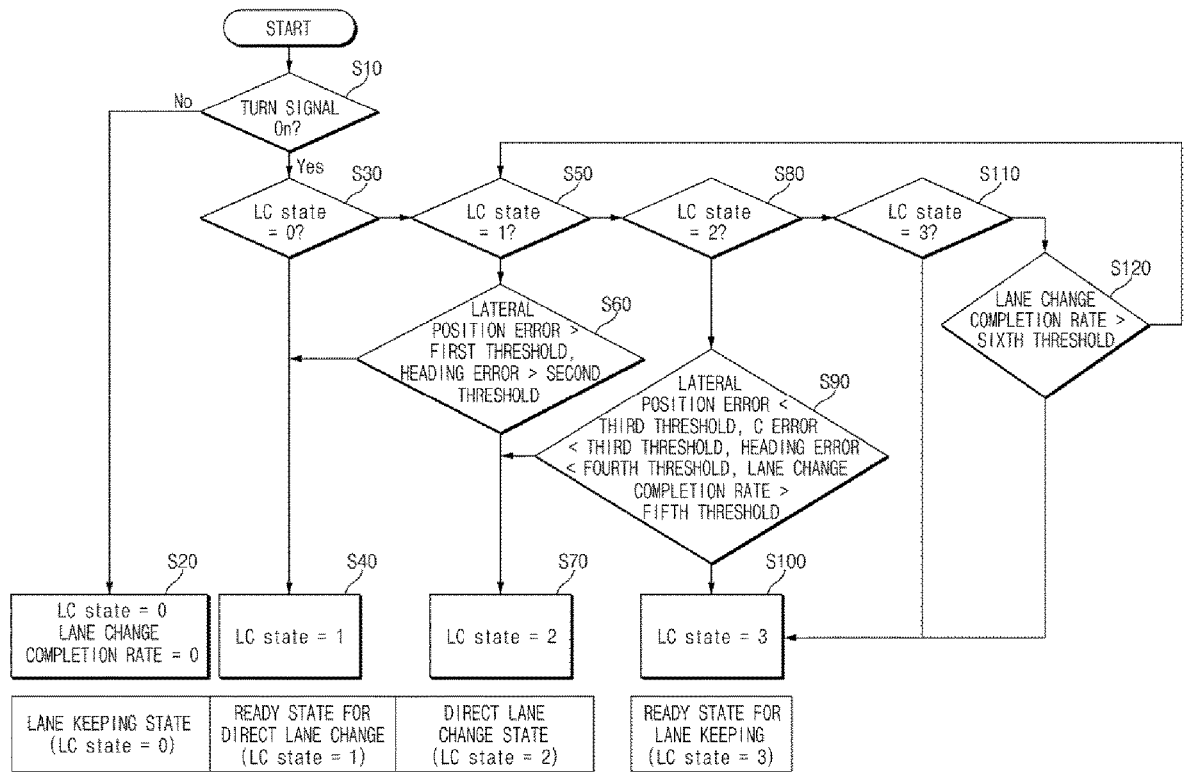
FIG. 2 illustrates a flowchart of a lane keeping assist method including the determination of driving states according to lane change, according to exemplary embodiments of the present invention.

FIG. 2 illustrates a flowchart of a lane keeping assist method including the determination of driving states according to lane change, according to exemplary embodiments of the present invention.

In the present invention, the driving state of the vehicle according to a state of a lane change in which the driver's intention is reflected, based on a lateral position error and a heading error with respect to a target path when a turn signal is applied, may be divided into the following four states: a lane keeping state; a ready state for direct lane change; a direct lane change state; and a ready state for lane keeping. A more detailed description thereof will be provided with reference to FIG. 2.

As illustrated in FIG. 2, it may be determined whether or not the turn signal is input in S10. When the turn signal is not input, the driving state may be determined as the lane keeping state (LC state=0) in S20. Here, the lane keeping state (LC state=0) refers to a driving state in which a lane change completion rate is "0", wherein the lane change completion rate refers to the degree of completion of lane change, which is determined by determining a lateral movement amount after the turn signal is applied, and comparing the determined lateral movement amount with a lane width.

When the turn signal is input, it may be determined whether the driving state is the lane keeping state in S30.

When the driving state is the lane keeping state (LC state=0) in the state in which the turn signal is applied, the vehicle may be expected to change its lane soon, and thus the driving state may be determined as a ready state for direct lane change (LC state=1) in S40.

Meanwhile, when the driving state is not the lane keeping state (LC state=0, S30), it may be determined whether the driving state is the ready state for direct lane change (LC state=1) in S50.

The ready state for direct lane change (LC state=1) refers to a driving state after the turn signal is applied and before the lateral position error is greater than a first threshold or the heading error is greater than a second threshold.

When the driving state is the ready state for direct lane change (LC state=1), it may be determined whether the lateral position error is greater than the first threshold or the heading error is greater than the second threshold in S60. When the lateral position error is greater than the first threshold or the heading error is greater than the second threshold, the vehicle may be out of the ready state for direct lane change and the driving state may be determined as the direct lane change state (LC state=2) in S70.

In addition, when the intention of the driver is slower than changing a lane to the target path or when the intention of the driver is faster than changing a lane to the target path, the driving state may be determined as the direct lane change state (LC state=2).

On the other hand, when the lateral position error is less than the first threshold and the heading error is less than the second threshold, the driving state may be determined as the ready state for direct lane change (LC state=1) in S40.

Meanwhile, when the driving state is not the ready state for direct lane change (LC state=1, S50) in the state in which the turn signal is applied, it may be determined whether the driving state is the direct lane change state (LC state=2) in S80.

The direct lane change state (LC state=2) refers to a driving state after the ready state for direct lane change (LC state=1) and before lane change completion conditions are all satisfied. Here, the lane change completion conditions include: the lateral position error is less than a third threshold; the heading error is less than a fourth threshold; and the lane change completion rate is greater than a fifth threshold.

When the driving state is the direct lane change state (LC state=2), it may be determined whether the lateral position error is less than the third threshold, whether the heading error is less than the fourth threshold, and whether the lane change completion rate is greater than the fifth threshold in S90. When the lateral position error is less than the third threshold, the heading error is less than the fourth threshold, and the lane change completion rate is greater than the fifth threshold, it may be determined that the lane change has been completed, and the driving state may be determined as the ready state for lane keeping (LC state=3) in which the vehicle is kept in its changed lane in S100.

Meanwhile, when the driving state is not the direct lane change state (LC state=2, S80), it may be determined whether the driving state is the ready state for lane keeping (LC state=3) in S110.

The ready state for lane keeping (LC state=3) refers to a driving state in which the lane change completion conditions are all satisfied, or the lane change completion rate is greater than or equal to a sixth threshold in the state in which the turn signal is applied.

When the driving state is not the ready state for lane keeping (LC state=3), it may be determined whether the lane change completion rate is greater than or equal to the sixth threshold in S120. When the lane change completion rate is greater than or equal to the sixth threshold, the driving state may be determined as the ready state for lane keeping (LC state=3) in S100, and when the lane change completion rate is less than the sixth threshold, it may be determined whether the driving state is the ready state for direct lane change (LC state=1) in S50.

Figure 3:
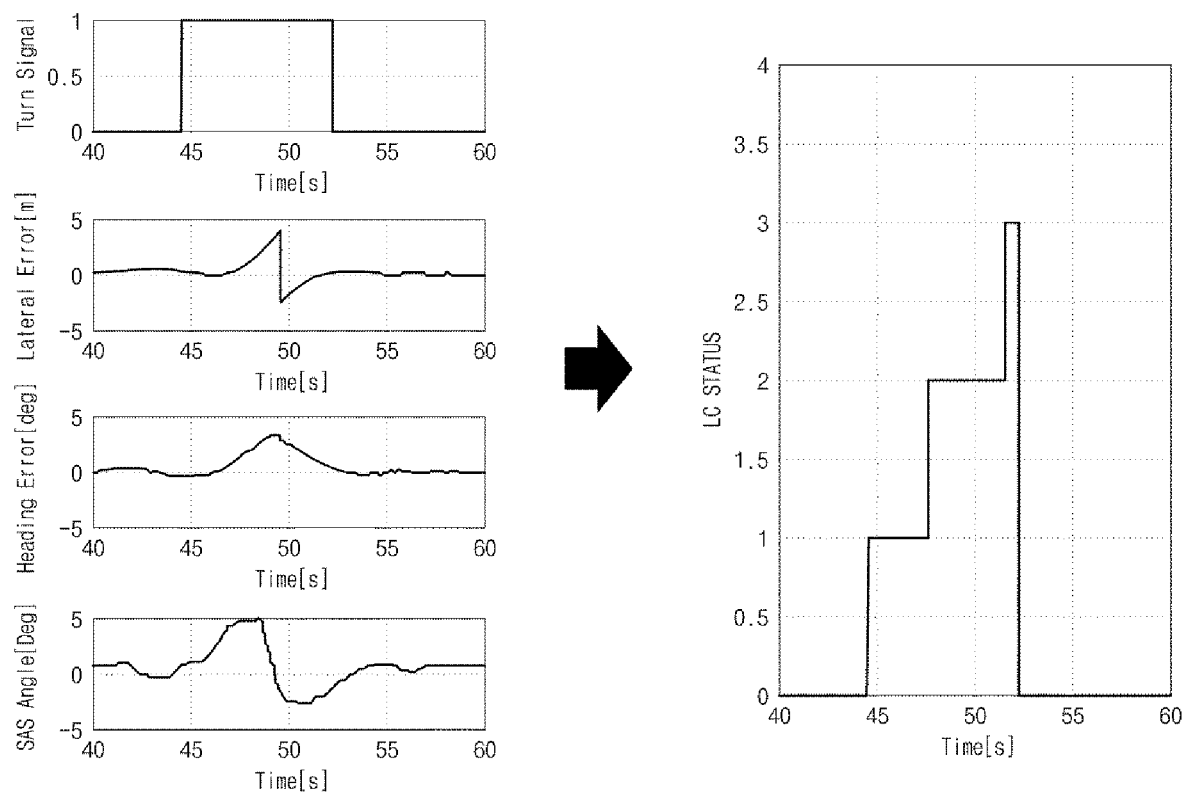
FIG. 3 illustrates a graph of driving states according to lane change, according to exemplary embodiments of the present invention.

The driving states determined according to the lane change in the flowchart of FIG. 2 may be represented as a graph of FIG. 3. FIG. 3 illustrates a graph of driving states according to lane change, according to exemplary embodiments of the present invention.

As illustrated in FIG. 3, it can be seen that with respect to the driving states according to the lane change state, the LC state may be determined as 0, 1, 2, and 3 using a turn signal, a lateral error, a heading error, and an SAS angle.

Figure 4:
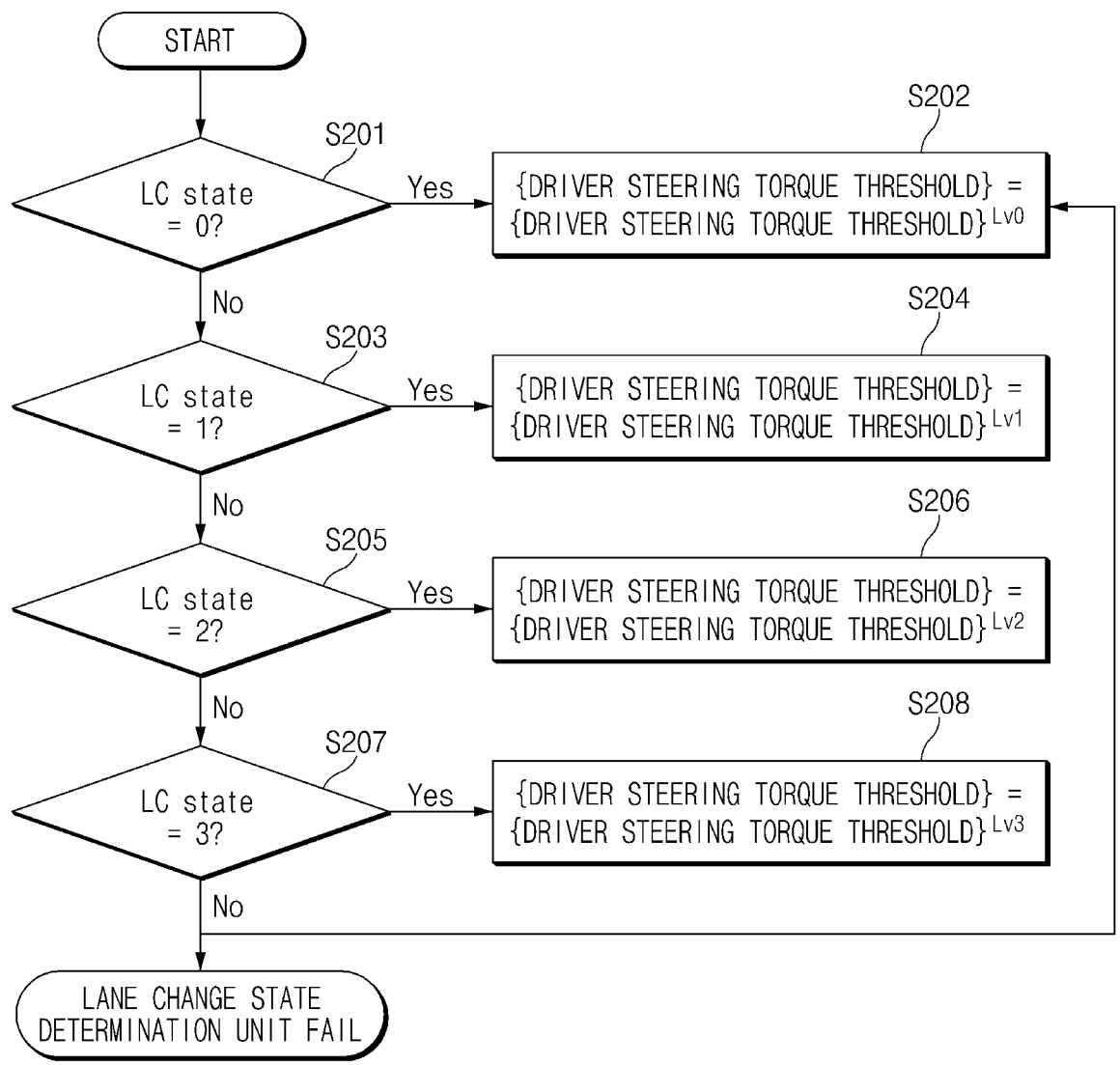
FIG. 4 illustrates thresholds determined according to driving states of a vehicle, according to exemplary embodiments of the present invention.

FIG. 4 illustrates thresholds determined according to driving states of the vehicle. In other words, the thresholds for determining an override may vary according to driving states to rapidly activate or cancel the override.

As illustrated in FIG. 4, first of all, it may be determined whether the driving state of the vehicle is the lane keeping state (LC state=0) in S201.

When the driving state of the vehicle is the lane keeping state, a driver steering torque threshold may be set to Lv0. When the driving state of the vehicle is not the lane keeping state, it may be determined whether the driving state of the vehicle is the ready state for direct lane change (LC state=1) in S203.

When the driving state of the vehicle is the ready state for direct lane change, the driver steering torque threshold may be set to Lv1 in S204. When the driving state of the vehicle is not the ready state for direct lane change, it may be determined whether the driving state of the vehicle is the direct lane change state (LC state=2) in S205.

When the driving state of the vehicle is the direct lane change state, the driver steering torque threshold may be set to Lv2 in S206. When the driving state of the vehicle is not the direct lane change state, it may be determined whether the driving state of the vehicle is the ready state for lane keeping (LC state=3) in S207.

When the driving state of the vehicle is the ready state for lane keeping, the driver steering torque threshold may be set to Lv3 in S208. When the driving state of the vehicle is not the ready state for lane keeping, it may be understood that it fails to determine a current lane change state of the vehicle. In the instant case, the driver steering torque threshold may be set to Lv0, which is the driver steering torque threshold in the lane keeping state.

As illustrated in FIG. 4, the driver steering torque thresholds may vary according to the driving states during the lane change, and thus the driver override may be rapidly determined in respective driving states to allow for activation or cancellation of the override.

Figure 5:
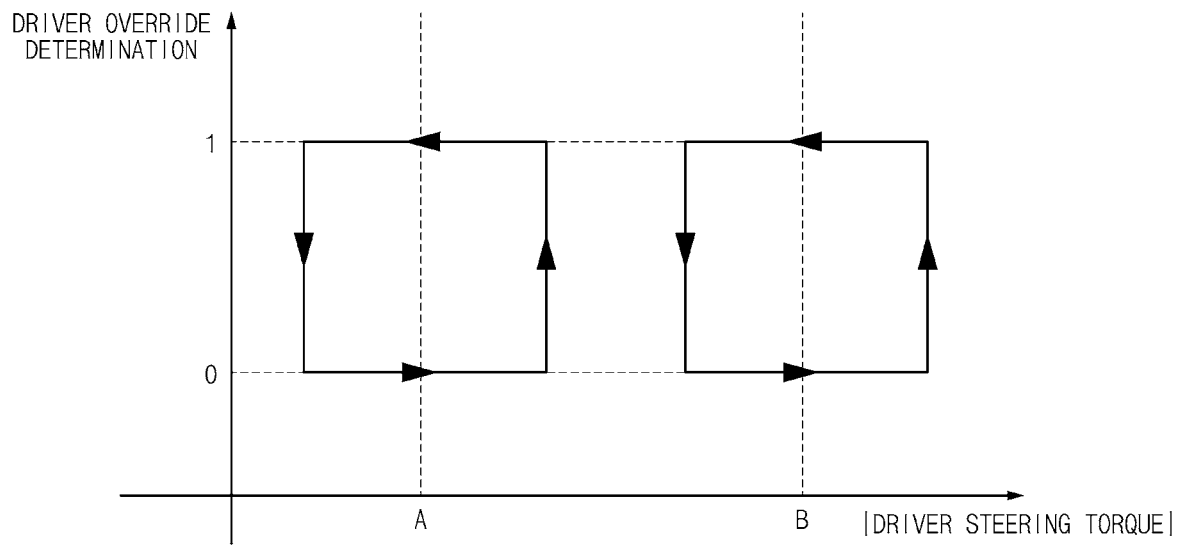
FIG. 5 illustrates a graph of determination of driver override, according to exemplary embodiments of the present invention.

FIG. 5 illustrates a graph showing a method for determining a driver override, according to exemplary embodiments of the present invention.

Referring to FIG. 5, A or B in FIG. 5 may be one of the driver steering torque thresholds Lv0 to Lv3 of FIG. 3. According to exemplary embodiments, when a driver steering torque is close to a threshold A or a threshold B, an override determination value may vibrate while repeating 0 and 1, and thus hysteresis may be set to prevent a frequent switch of override activation (1) and override cancellation (0) when the driver steering torque is close to the threshold.

Figure 6:
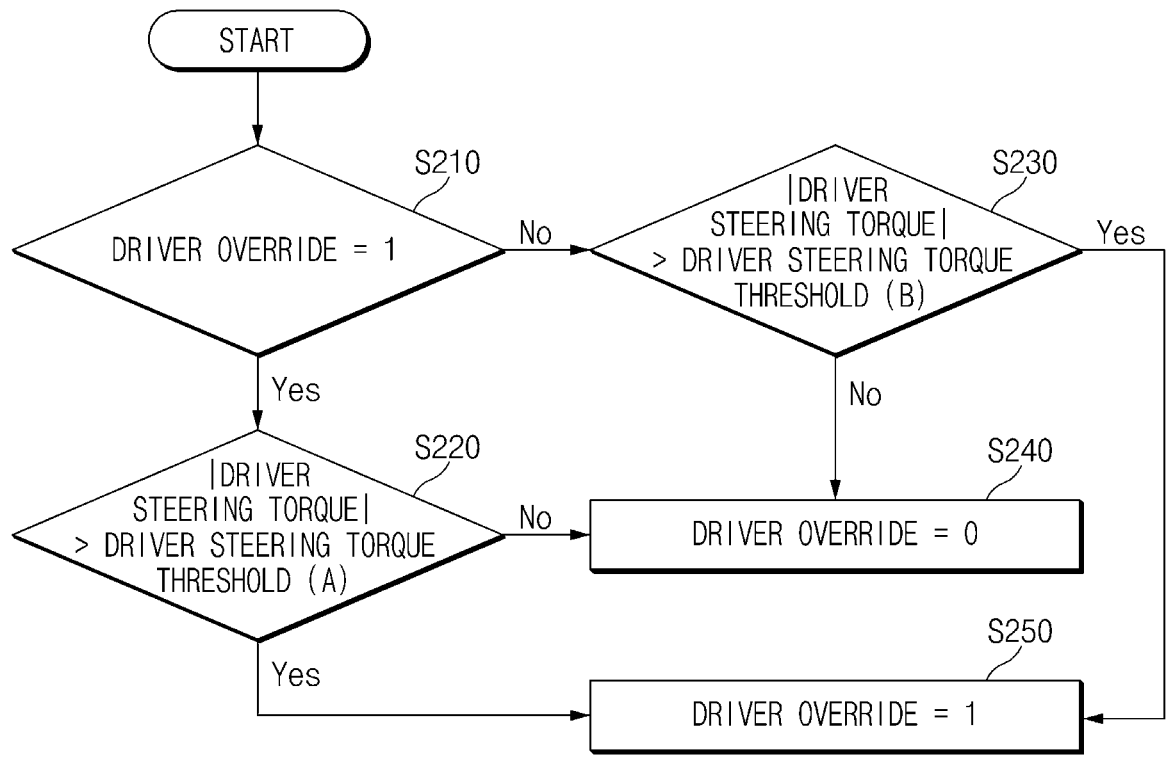
FIG. 6 illustrates a flowchart of a method for determining a driver override, according to exemplary embodiments of the present invention.

FIG. 6 illustrates a flowchart of a method for determining a driver override, according to exemplary embodiments of the present invention.

As illustrated in FIG. 6, first of all, it may be determined whether a driver override is activated in S210. When the driver override is activated, it may be determined whether a driver steering torque is greater than a driver steering torque threshold A in S220. When the driver steering torque is greater than the driver steering torque threshold A, it may be determined as the driver override in S250, and the driver may be allowed to take over the driving control of the vehicle. When the driver steering torque is less than the driver steering torque threshold A in S220, the driver override may be cancelled in S240.

When the driver override is not activated in S210, it may be determined whether the driver steering torque is greater than a driver steering torque threshold B in S230. When the driver steering torque is greater than the driver steering torque threshold B, the driver override may be activated in S250. When the driver steering torque is less than the driver steering torque threshold B, the driver override may be cancelled in S240.

FIG. 7, FIG. 8, FIG. 9, FIG. 10, and FIG. 11 illustrate driving states in a lane keeping assist method, according to exemplary embodiments of the present invention.

Figure 7:
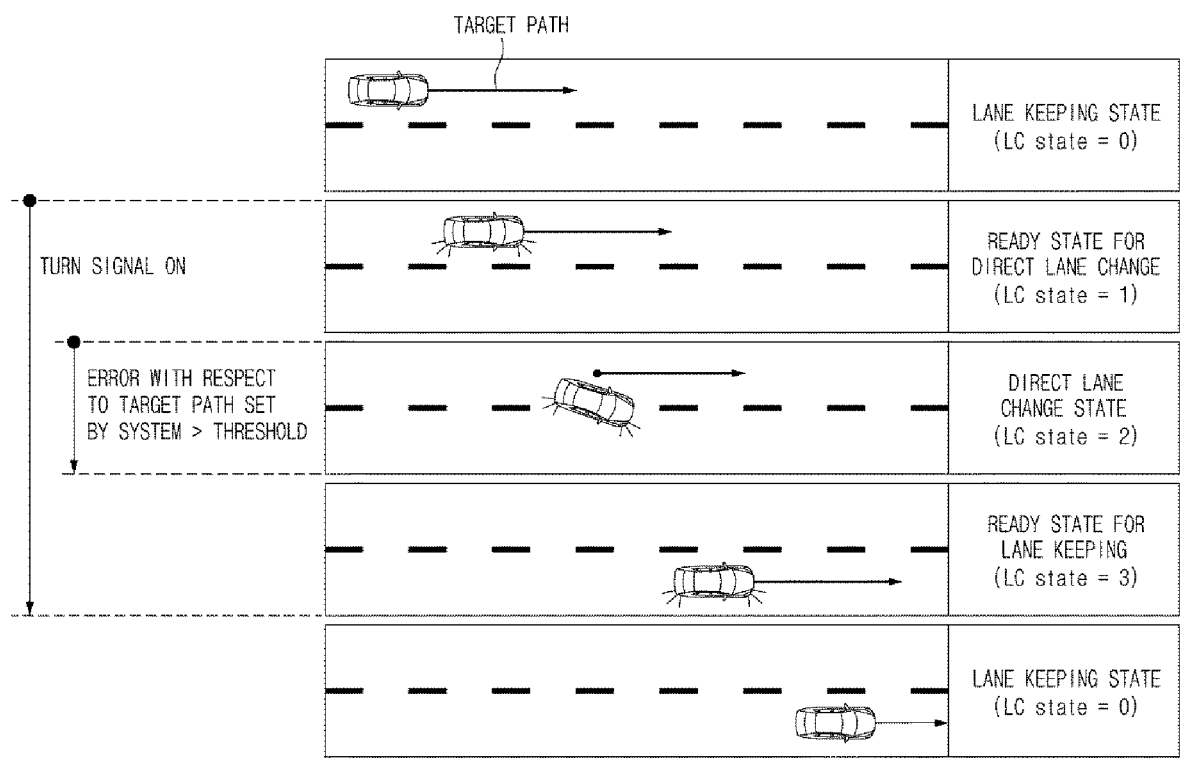
FIG. 7, FIG. 8, FIG. 9, FIG. 10, and FIG. 11 illustrate driving states in a lane keeping assist method, according to exemplary embodiments of the present invention.

FIG. 7 illustrates a case in which a driver directly changes a lane when a system determines that a lane change is infeasible in an autonomous driving state and sets a target path to keep a vehicle in a lane in which the vehicle is currently driving. First of all, when the target path and the driving path of the vehicle match and the vehicle is kept in its currently driving lane, the driving state of the vehicle may be the lane keeping state (LC state=0).

When the driver intentionally prepares to change the lane directly by applying a turn signal, the driving path of the vehicle may still match the target path, and the driving state of the vehicle may be the ready state for direct lane change (LC state=1).

When the vehicle drifts out of the target path as an error with respect to the target path set by the system is greater than a threshold in the state in which the driver applies the turn signal, the driving state of the vehicle may be the direct lane change state (LC state=2).

According to exemplary embodiments of the present invention, when the vehicle drifts out of the target path and the error between the driving path and the target path is greater than the threshold, it may be determined as an override, preventing the driver from feeling discomfort. To the present end, in the direct lane change state, the driver steering torque threshold Lv2 (see FIG. 3) may be determined to A of FIG. 5. When the driver steering torque threshold is reduced (B→A), even when the driver only applies a small steering torque, the control by the system may be cancelled so that the driver may be allowed to change the lane directly without discomfort. When the control by the system is cancelled, autonomous driving may also be cancelled. Here, reducing the driver steering torque threshold may be equivalent to lowering the criterion for driver override.

In the direct lane change state (LC state=2), as described above with reference to FIG. 1, it may be determined whether the lane change completion conditions are satisfied, or the lane change completion rate is greater than or equal to the sixth threshold in the state in which the turn signal is applied. When the above-described conditions are satisfied, the driving state of the vehicle may be the ready state for lane keeping (LC state=3).

According to exemplary embodiments of the present invention, in the ready state for lane keeping, as the vehicle approaches the target path set by the system, when the error between the driving path and the target path is less than the threshold, the driver override may be cancelled. To the present end, in the ready state for lane keeping, the driver steering torque threshold Lv3 (see FIG. 3) may be set to B of FIG. 5. In the instant case, since the driver steering torque threshold is increased, even when the driver applies a small steering torque, it may not be determined as the driver override. Here, increasing the driver steering torque threshold may be equivalent to raising the criterion for driver override. As such, the driving state may be changed to the autonomous driving state through the operation of an input device, and the system may take over the driving control.

Thus, when the driver intervenes to change the lane in the autonomous driving state, that is, in which the system takes control of the vehicle to drive the vehicle while keeping the vehicle in its lane, the driver steering torque threshold may be adjusted according to the driving states of the vehicle so that the override may appropriately be activated or cancelled and the driving control may easily be switched from the system to the driver and from the driver to the system to prevent the driver from feeling discomfort.

Figure 8:
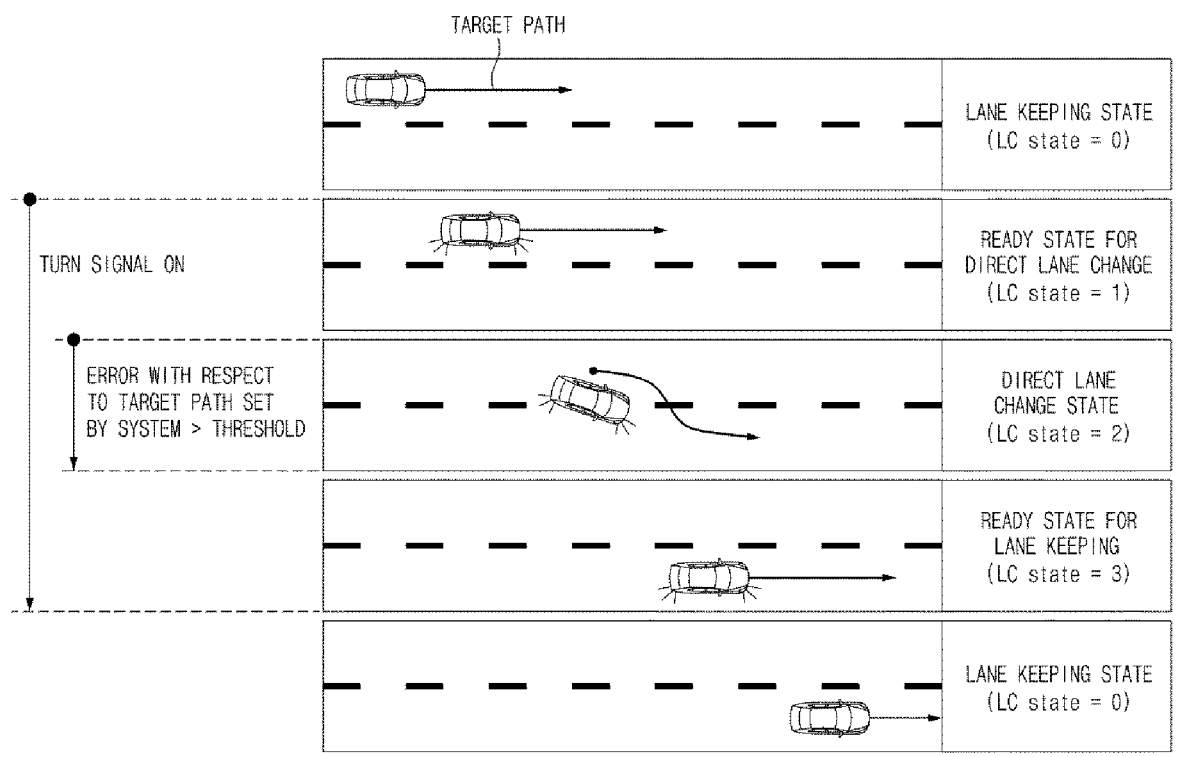
Figure 9:
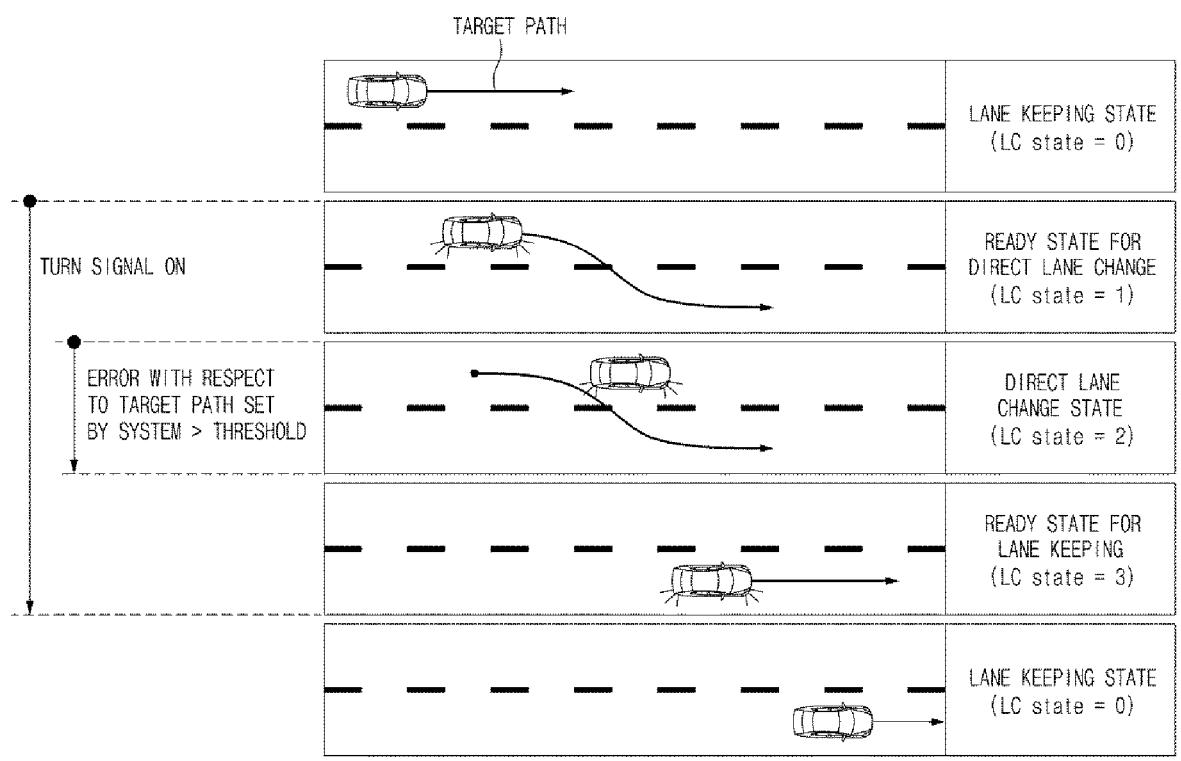

FIG. 8 and FIG. 9 illustrate a case in which a driver directly changes a lane when a system determines that a lane change is feasible in an autonomous driving state and sets a target path to change a lane. FIG. 8 illustrates a case in which the driver's intention to change a lane is slower than changing the lane to the target path set by the system, and FIG. 9 illustrates a case in which the driver's intention to change a lane is faster than changing the lane to the target path set by the system.

First of all, when the target path and the driving path of the vehicle match and the vehicle is kept in its currently driving lane, the driving state of the vehicle may be the lane keeping state (LC state=0).

When the driver intentionally prepares to change the lane directly by applying a turn signal, the driving path of the vehicle may still match the target path, and the driving state of the vehicle may be the ready state for direct lane change (LC state=1).

When the intention of the driver is faster than changing the lane to the target path set by the system in the state in which the driver applies the turn signal (see FIG. 8) or when the intention of the driver is slower than changing the lane to the target path set by the system in the state in which the driver applies the turn signal (see FIG. 9), the vehicle may be considered to drift out of the target path. In the instant case, the driving state of the vehicle may be the direct lane change state (LC state=2).

According to exemplary embodiments of the present invention, when the vehicle drifts out of the target path, it may be determined as an override, preventing the driver from feeling discomfort. To the present end, as described above with reference to FIG. 7, the driver steering torque threshold (the criterion for driver override) may be lowered in the direct lane change state, even when the driver only applies a small steering torque, the control by the system may be cancelled (the autonomous driving may be cancelled) to prevent the driver from feeling discomfort. A more detailed description thereof is provided with reference to FIG. 7.

In the direct lane change state (LC state=2), as described above with reference to FIG. 2, it may be determined whether the lane change completion conditions are satisfied, or the lane change completion rate is greater than or equal to the sixth threshold in the state in which the turn signal is applied. When the above-described conditions are satisfied, the driving state of the vehicle may be the ready state for lane keeping (LC state=3).

According to exemplary embodiments of the present invention, in the ready state for lane keeping, as the vehicle approaches the target path set by the system and the driving path and the target path match, the driver override may be cancelled. To the present end, in the ready state for lane keeping, the driver steering torque threshold Lv3 (the criterion for driver override) may be increased. In the instant case, even when the driver applies a small steering torque, it may not be determined as the driver override. As such, the driving state may be changed to the autonomous driving state through the operation of an input device, and the system may take over the driving control. Here, increasing the driver steering torque threshold may be equivalent to raising the criterion for driver override.

Figure 10:
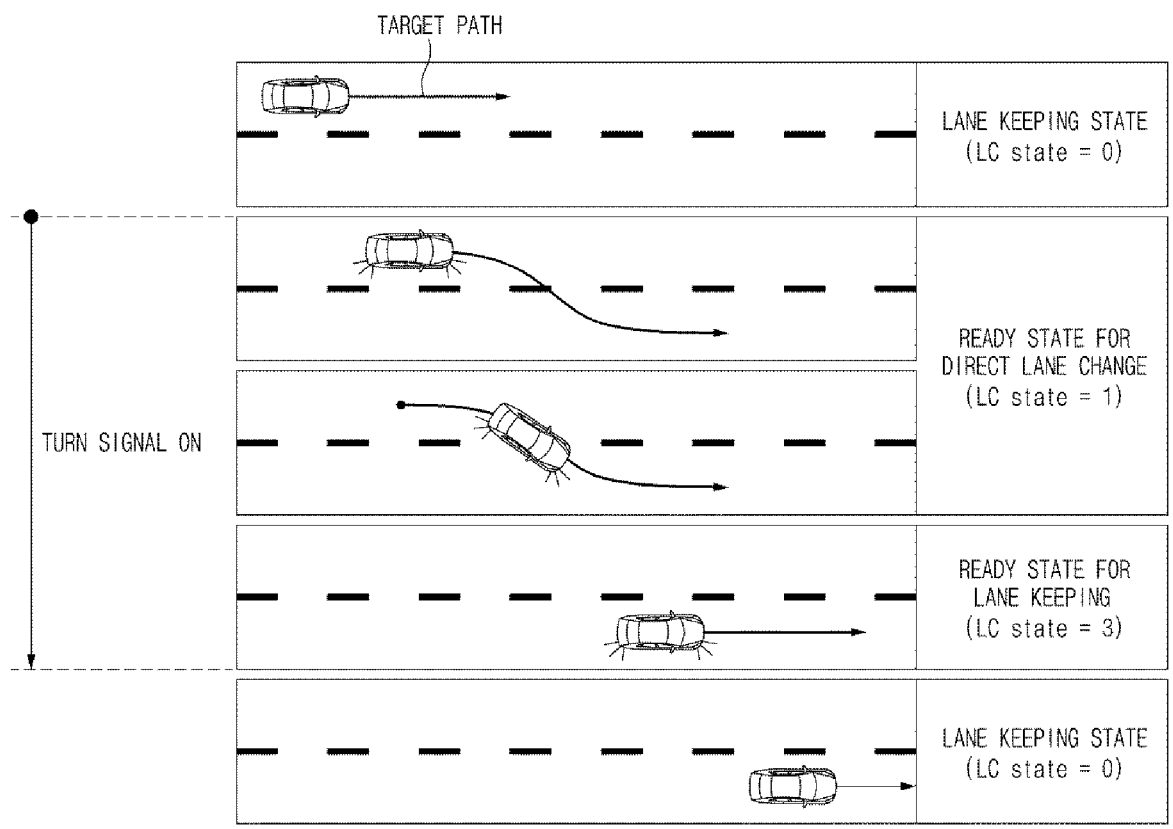
Figure 11:
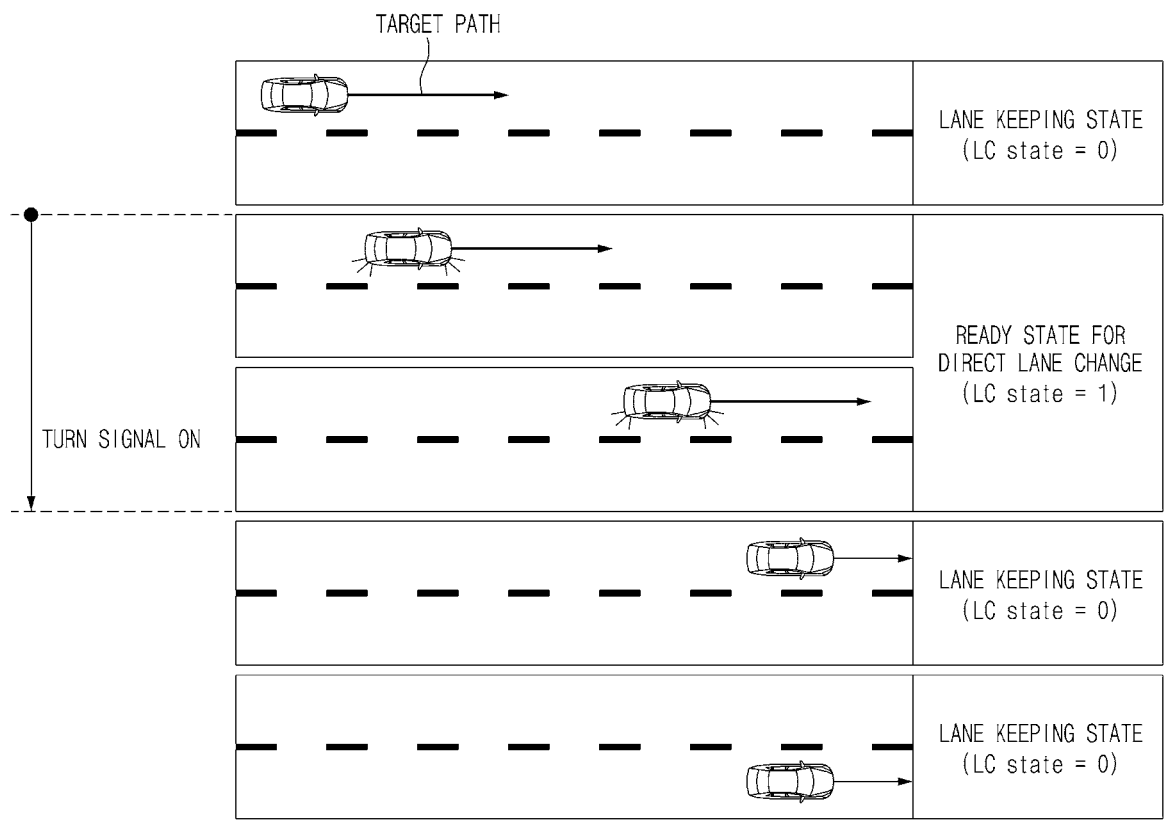

FIG. 10 illustrates a process of changing a lane to a target path set by a system, and FIG. 11 illustrates a process of cancelling a lane change by a driver in a state in which the system determines that a lane change is infeasible.

FIG. 10, and FIG. 11 illustrate a case in which the control of the system is not contrary to the intention of the driver. In the instant case, the vehicle may be driven under the control of the system without the need to switch the driving control from the system to the driver.

Figure 12:
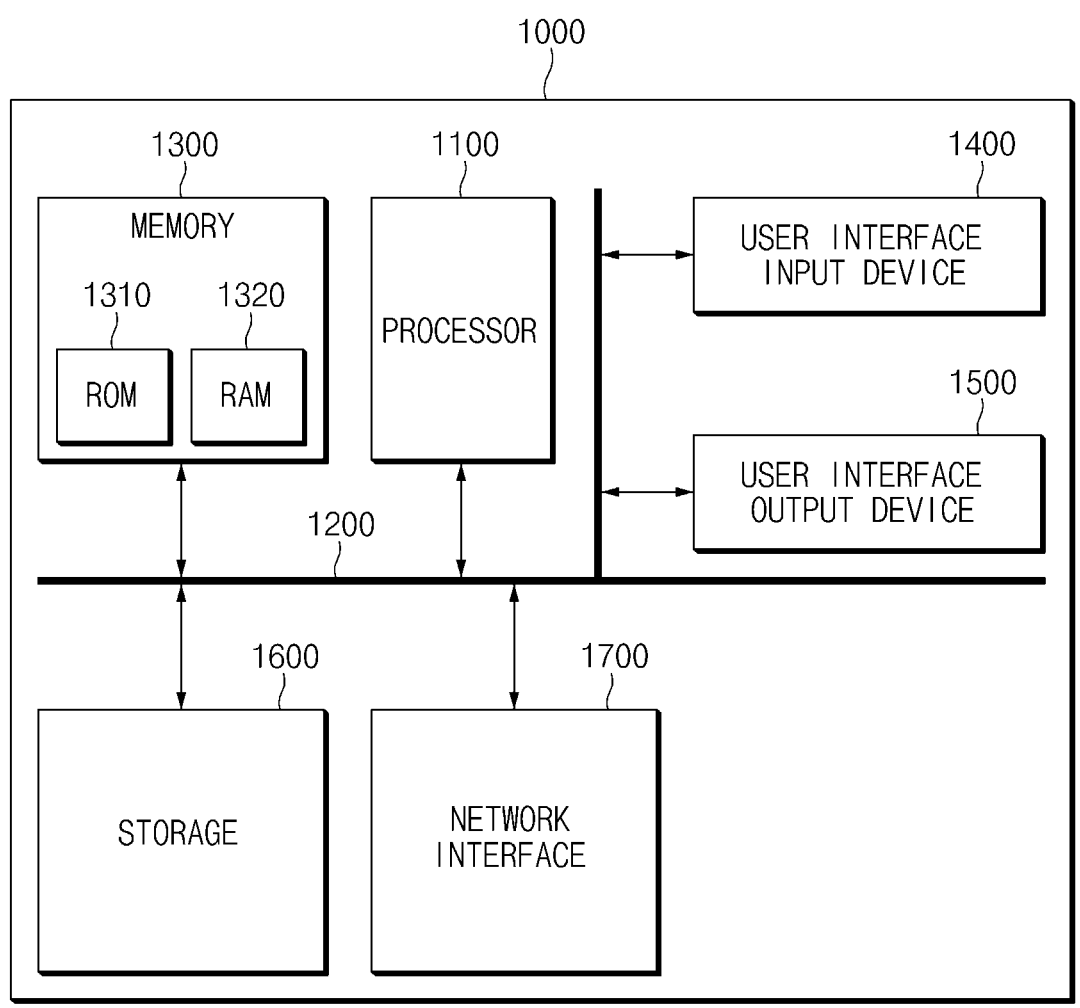
FIG. 12 illustrates the configuration of a computing system by which a method according to exemplary embodiments of the present invention is executed.

FIG. 12 illustrates the configuration of a computing system by which a method according to exemplary embodiments of the present invention is executed.

Referring to FIG. 12, a computing system 1000 includes at least one processor 1100, a bus 1200, a memory 1300, a user interface input device 1400, a user interface output device 1500, a storage 1600, and a network interface 1700, wherein these elements are connected through the bus 1200.

The processor 1100 may be a central processing unit (CPU) or a semiconductor device processing commands stored in the memory 1300 and/or the storage 1600. The memory 1300 and the storage 1600 include various types of volatile or non-volatile storage media. For example, the memory 1300 includes a read only memory (ROM) and a random access memory (RAM).

Therefore, the steps of the method or algorithm described with reference to the exemplary embodiments included herein may be embodied directly in hardware, in a software module executed by the processor 1100, or in a combination thereof. The software module may reside in a storage medium (i.e., the memory 1300 and/or the storage 1600) including RAM, a flash memory, ROM, an erasable programmable read-only memory (EPROM), an electrically erasable programmable read-only memory (EEPROM), a register, a hard disk, a removable disk, and a CD-ROM. An exemplary storage medium may be coupled to the processor 1100, such that the processor 1100 may read information from the storage medium and write information to the storage medium. Alternatively, the storage medium may be integrated with the processor 1100. The processor 1100 and the storage medium may reside in an application specific integrated circuit (ASIC). The ASIC may reside in a user terminal. Alternatively, the processor 1100 and the storage medium may reside as discrete components in a user terminal.

As set forth above, the lane keeping assist method and system, according to exemplary embodiments of the present invention, may rapidly determine the driver's intention to intervene in the steering operation by varying the criteria for driver steering override according to the movements of the vehicle when the turn signal is applied, minimizing the driver's discomfort in the steering operation.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A lane keeping assist method, comprising steps of:
   determining whether a turn signal is applied;
   determining a state of a lane change in which a timing of a driver's driving control of a vehicle is reflected when the turn signal is applied;
   adjusting a criterion for driver override depending on an error between a driving path of the vehicle and a target path; and
   comparing a steering torque of the driver with the adjusted criterion to determine the driver override, wherein the steering toque of the driver is obtained by a torque sensor,
   wherein the driver override is a state that the driver has driving control of the vehicle in autonomous driving of the vehicle, and
   wherein the adjusting the criterion for the driver override includes:
      setting the criterion for the driver override to a second value greater than a first value when the error is less than a threshold; and
      determining cancellation of the driver override when the steering torque of the driver is less than the second value, wherein the first value is set to the criterion for the driver override when the error is greater that the threshold.

2. The lane keeping assist method according to claim 1, wherein the adjusting the criterion for the driver override further includes:
   determining activation of the driver override when the steering torque of the driver is greater than the first value.

3. The lane keeping assist method according to claim 1, wherein the determining the state of the lane change includes dividing a driving state of the vehicle into a lane keeping state, a ready state for direct lane change, a direct lane change state, and a ready state for lane keeping, according to the state of the lane change.

4. The lane keeping assist method according to claim 3, wherein the lane keeping state refers to a state in which the turn signal is not applied and a lane change completion rate is 0.

5. The lane keeping assist method according to claim 4, wherein the lane change completion rate refers to a degree of completion of lane change, which is determined by comparing a lateral movement amount of the vehicle.

6. The lane keeping assist method according to claim 3, wherein the ready state for direct lane change refers to a state in which the driving state of the vehicle is the lane keeping state when the turn signal is applied, and refers to a state after the turn signal is applied and before a lateral position error is greater than a first threshold or a heading error is greater than a second threshold.

7. The lane keeping assist method according to claim 3, wherein the direct lane change state refers to a state in which a lateral position error is greater than a first threshold or a heading error is greater than a second threshold, and refers to a state after the ready state for direct lane change and before a lane change completion condition is satisfied.

8. The lane keeping assist method according to claim 7, wherein the lane change completion condition includes:
   the lateral position error is less than a third threshold;
   the heading error is less than a fourth threshold; and
   a lane change completion rate is greater than a fifth threshold.

9. The lane keeping assist method according to claim 3, wherein the ready state for lane keeping refers to a state in which a lateral position error is less than a third threshold, a heading error is less than a fourth threshold, and a lane change completion rate is greater than a fifth threshold, or a state in which the lane change completion rate is greater than or equal to a sixth threshold when the turn signal is applied.

10. The lane keeping assist method according to claim 3, wherein the criterion for driver override varies according to the lane keeping state, the ready state for direct lane change, the direct lane change state, and the ready state for lane keeping.

11. The lane keeping assist method according to claim 1, wherein the adjusting the criterion for the driver override includes setting the first value and the second value with a hysteresis to allow each of the first value and the second value to have a predetermined range to prevent an activation of the driver override and the cancellation of the driver override from being repeatedly switched around the first value and the second value.

12. The lane keeping assist method according to claim 1, wherein a case in which the error is greater than the threshold in the adjusting the criterion for the driver override depending on the error between the driving path of the vehicle and the target path, includes any one of a case in which a timing of the driver's driving control of the vehicle is slower than changing a lane to the target path and a case in which the timing of the driver's driving control of the vehicle is faster than changing the lane to the target path.

13. A lane keeping assist system, comprising:
- a lane change state determination device determining a state of a lane change of a vehicle after a turn signal is applied;
- a threshold adjustment device receiving a result of the state of the lane change from the lane change state determination device and adjusting a criterion for driver override depending on an error between a driving path of the vehicle and a target path according to the state of the lane change; and
- an override determination device comparing a steering torque of a driver with the adjusted criterion to determine the driver override, wherein the steering torque of the driver is obtained by a torque sensor,
- wherein the driver override is a state that the driver has driving control of the vehicle in autonomous driving of the vehicle, and
- wherein the threshold adjustment device adjusts the criterion for the driver override to a first value when the error is greater than a threshold, and adjusts the criterion for the driver override to a second value greater than the first value when the error is less than the threshold.

14. The lane keeping assist system according to claim 13, wherein the lane change state determination device is configured to determine a driving state of the vehicle as one of a lane keeping state, a ready state for direct lane change, a direct lane change state, and a ready state for lane keeping, according to the state of the lane change.

15. The lane keeping assist system according to claim 14, wherein the threshold adjustment device adjusts the criterion for the driver override to vary according to the lane keeping state, the ready state for direct lane change, the direct lane change state, and the ready state for lane keeping.

16. The lane keeping assist system according to claim 14, wherein the threshold adjustment device adjusts the criterion for the driver override to the first value in the direct lane change state, and adjusts the criterion for the driver override to the second value greater than the first value in the ready state for lane keeping.

17. The lane keeping assist system according to claim 14, wherein the lane change state determination device is configured to determine the driving state of the vehicle as the direct lane change state when a timing of the driver's driving control of the vehicle is slower than changing a lane to the target path or when the timing of the driver's driving control of the vehicle is faster than changing the lane to the target path.

18. The lane keeping assist system according to claim 13, wherein the override determination device is configured to determine activation of the driver override when the steering torque of the driver is greater than the first value, and is configured to determine cancellation of the driver override when the steering torque of the driver is less than the second value.

\* \* \* \* \*